United States Patent Office 3,462,163
Patented Aug. 19, 1969

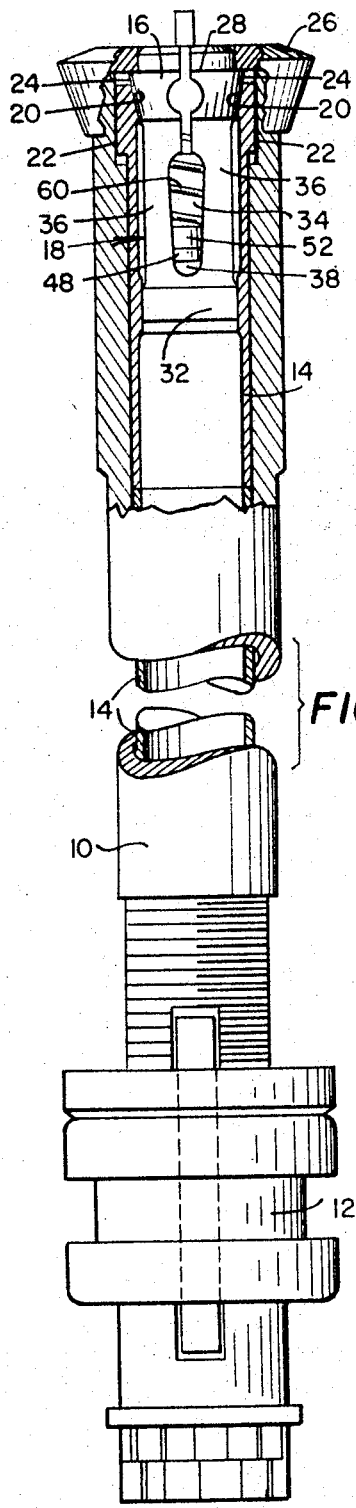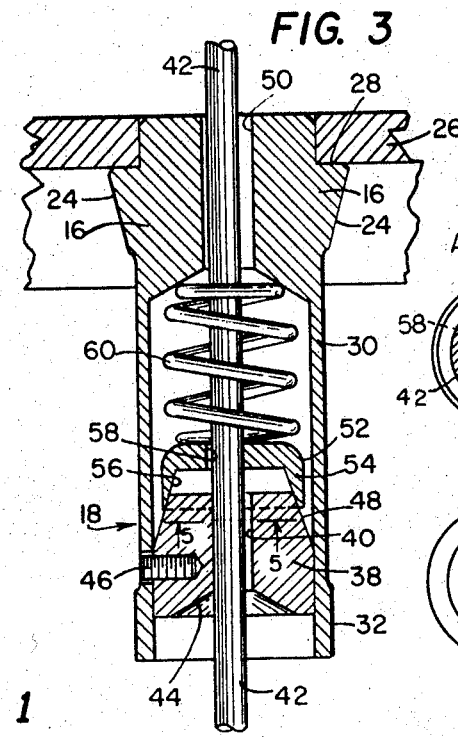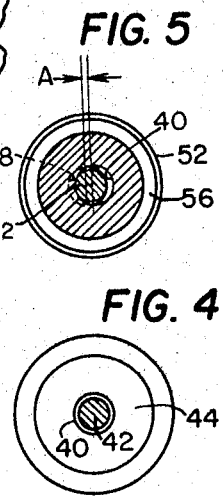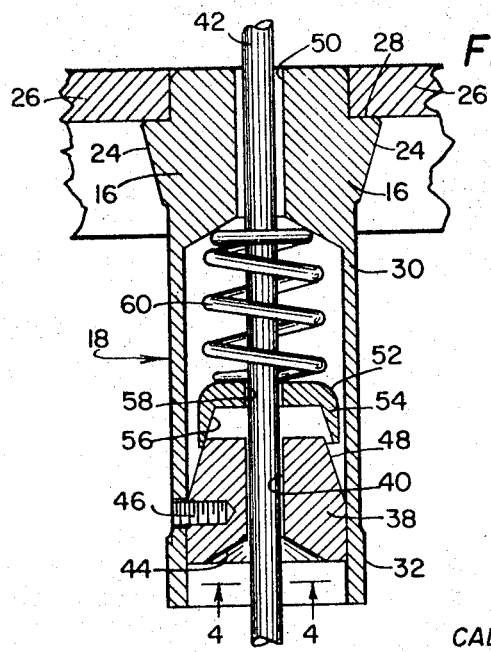
Inventor
CALVIN O. BROWN
BY
Prangly, Baird, Clayton, Miller & Vogel.
ATTYS.

3,462,163
COLLET STOCK LOCK
Calvin O. Brown, Bartlett, Ill., assignor to Set Screw & Manufacturing Company, Bartlett, Ill., a corporation of Illinois
Filed Sept. 8, 1965, Ser. No. 485,869
Int. Cl. B23b 31/12, 5/22, 5/34
U.S. Cl. 279—50                                16 Claims

ABSTRACT OF THE DISCLOSURE

There is disclosed a collet for supporting rod-like stock material during a machining operation, including a hollow body member, a plurality of gripping jaws at one end of the body member, and means in the body member for locking the stock material against rearward axial movement relative to the gripping jaws during a machining operation on the material, the locking means comprising first and second elements provided with juxtaposed respective first and second apertures adapted slidably to receive the stock material therethrough, and means for moving one of the elements and its aperture laterally so as to clamp the stock material between side wall portions of the first and second apertures.

---

This invention relates to the machine tool art, and more particularly to collets for holding stock material while it is being operated upon by working tools.

In the manufacture of headless set screws having hexagon or similarly shaped tool receiving openings in one end, for example, it is customary to drill a hole in the end of a rod of stock material and then hammer a broaching tool into the drilled opening to form the angular shaped recess while the rod is clamped in a collet with a predetermined length of the rod extending beyond the collet. After a threading operation the exposed length is cut off, another length advanced through the collet, and the operation repeated.

It has been found in practice, however, that frequently the rod of stock material is not gripped sufficiently tight by the jaws of the collet to prevent backward movement or slippage of the rod in the collet during a hammering or broaching operation, thus resulting in a defective set screw. This is particularly true when the collet is of the spring jaw type and the work rod is held merely by the friction of the jaws.

It is, accordingly, an object of my invention to provide a collet for rod-like stock material in which the stock is firmly locked against backward movement in the collet during a working operation.

A further object is to provide a locking means to prevent backward and rotational movement of the work stock in a collet of the spring jaw type.

A further object is to provide a collet stock lock that is fully automatic in operation, both to permit forward feeding of the stock and to prevent backward movement of the stock when the collet is clamped.

A further object is to provide a collet stock lock that is capable of operation with automatic machine tools such as an automatic screw machine.

A still further object is to provide a collet with a stock lock that is positive in action, rugged in construction, simple in operation, and comprised of few moving parts.

These and other objects will be apparent from the following description and the accompanying drawing which illustrate a preferred embodiment of the invention, and in which:

FIG. 1 is an elevational or plan view of a spindle, with parts broken away, provided with a spring jaw collet containing a stock locking means in acordance with the present invention;

FIG. 2 is a sectional view of the collet with the stock lock in open or feeding condition and with certain openings exaggerated and certain parts shown in full;

FIG. 3 is a similar sectional view showing the parts in the locked position;

FIG. 4 is an elevational or end view looking in the direction of the arrows in FIG. 2 of the rod supporting end bushing or plug for the collet body or shell; and FIG. 5 is an elevational or end view of the stock locking member looking in the direction of the arrows 5—5 in FIG. 3.

Referring to FIG. 1, the numeral 10 refers generally to a hollow spindle which may be one of the spindles of a machine tool such as an automatic screw machine. The spindle 10 carries a collar 12 which is axially slidable on the spindle and moves a tube 14 slidably mounted within the spindle to operate spring jaws 16 of a collet 18 into gripping and non-gripping positions. Thus if the collar 12 and tube 14 are moved in a forward (upward in FIG. 1) direction the inclined cam surface 20 on the enlarged end 22 of the tube 14 engage the corresponding cam faces 24 of the spring jaws 16 and cause the jaws to move into gripping engagement with a rod of stock material fed to the jaws through the hollow interior of the spindle. Upon movement of the collar and tube in the opposite direction the cam surfaces 20 and 24 permit the jaws 16 to spring apart and release the stock material for further feeding movement. The stock material can be advanced predetermined distances forward in combination with operation of the collar 12 and tube 14 to ungrip the material in any suitable manner well known in the machine tool art. A screw cap 26 mounted on the end of the spindle engages shoulders 28 on the collet jaws and retains the collet within the spindle and tube 14.

The mechanism thus far described is generally similar to that presently employed in automatic screw machines for clamping and supporting rod stock during work operations, such as in the forming of headless set screws of the type above described. In accordance with the present invention, however, the collet 18 is provided with a second or auxiliary locking device for firmly clamping the stock material against axial movement backwardly into the collet and spindle should there be any slippage of the rod stock in the collet jaws during a working operation such as hammering the end of the stock with a broaching tool.

Referring more particularly to FIGS. 2 and 3, the collet 18 is illustrated as comprising a tubular body or shell 30 having the spring jaws 16 integrally formed on one end and the opposite end open. The wall of the body member 30 is slightly thickened at the open end to provide a raised surface 32 which is machined to provide a bearing surface for the slidable tube 14 of FIG. 1. The inclined outer cam surfaces 24 of the spring jaws are likewise machined more readily to cooperate with the cam surface 20 of operating tube 14. The wall of the body member 30 is also provided with the usual longitudinally extending slots or openings 34 (FIG. 1) to provide flexible spring arms 36 for the jaws 16. The body member 30 is preferably made out of an alloy steel which is heat treated to provide sufficient strength and resilience to permit the jaws 16 to move inwardly to grip stock material as shown in FIG. 3, and to spring back into an open or non-gripping position as shown in FIG. 2.

A removable plug or bushing 38 is mounted in the open end of the body member 30 and normally provides a closure for the rear end of the collet. The bushing 38 is provided with a central aperture 40 which is of a size and shape slidably to receive a rod 42 of stock material and serves as a guide and support for the rod stock and also serves as a part of a locking mechanism as hereinafter set forth. The size of the aperture 40 relative to the size of the stock material is such as to permit the rod stock readily to slide therethrough but at the same time provide a relatively close fit. For example, if the stock rod has a diameter of ⅛ (.125) inch, the aperture may have a diameter of .140 inch. The outer end of the bushing 38 is also preferably provided with an inclined surface 44 leading to the aperture 40 to assist in guiding the stock rod 42 into the opening. The bushing 38 is normally retained in position within the body member 30 by one or more set screws 46 arranged around the circumference of the shell.

The inner end or face of the bushing 38 is provided with a frusto-conical surface 48 which surrounds the aperture 40 and is coaxial therewith. The aperture 40, the frusto-conical surface 48, and the opening 50 (FIG. 2) between the jaws 16 are thus all in axial alignment. A locking member 52 comprising a flanged disc or cup-shaped member is positioned loosely within the hollow body member 30 between the bushing 38 and the jaws 16 with the flange 54 thereof surrounding the frusto-conical surface 48 of the bushing in a nesting relationship. The inner face or wall of the flange 54 is preferably inclined to provide a frusto-conical surface 56 which has the same angle of incline as the surface 48 of the bushing and is adapted to mate therewith. To assist in the movement of the locking member 52 and to prevent locking or freezing of the parts in the clamped position, the frusto-conical surfaces have a relatively steep angle of inclination, in the order of 20 degrees from the vertical axis for example.

The cup-shaped locking member 52 is also provided with an aperture 58 which is positioned slightly off-center so that the axis of the aperture 58 is offset a slight distance from the axis of the disc and the frusto-conical surface 56 as indicated at A in FIG. 5. The size and shape of the aperture 58 is substantially the same as those of the aperture 40 in bushing 38 so as to slidably but relatively closely receive the stock rod 42. With ⅛ inch stock, the aperture might be .140 inch in diameter, for example, as was the aperture 40 in the bushing 38.

A coil spring 60 is positioned in the hollow body member 30 between the locking member 52 and the inner ends of the jaws 16 and serves normally to urge the locking member towards the bushing 38 with the frusto-conical surfaces 56 and 48 in seating or mating engagement as illustrated in FIG. 3. The force or pressure exerted by the spring 60 is just enough to retain the flange 54 of locking member 52 in an overlapping or nesting relationship with respect to the conical surface 48 of bushing 38 when the locking member is in a raised or non-clamping position during feeding of stock as illustrated in FIG. 2. The spring 60 also serves to hold the locking member in a proper position during assembly of the lock mechanism. All of the parts can be readily assembled or removed by merely loosening the set screws 46 and removing the bushing 38.

The operation of the device is as follows. With no stock in the collet, the spring jaws 16 are in an open or non-gripping position as shown in FIG. 2 but the locking member 52 would be urged by spring 60 into a seating or mating engagement with the frusto-conical surface 48 on bushing 38 as shown in FIG. 3. The aperture 58 of the locking member 52 would then be slightly offset with respect to the aperture 40 of the bushing as also illustrated in FIG. 3. Upon insertion of a stock rod 42 through the guide 44 and aperture 40 of the bushing 38, the end of the rod will engage the disc portion of the locking member 52 and raise the locking member sufficiently to permit the floating member to move laterally on the inclined surface 48 and bring the aperture 58 into alignment with aperture 40 as shown in FIG. 2. The rod 42 then slips through the aperture 58 and can be fed through the opening 50 between the jaws 16. The spring 60 then reseats the locking member 52 on the frusto-conical portion 48 of bushing 38 and again causes the aperture 58 to move laterally into a clamping position relative to the stock rod 42 as shown in FIG. 3.

The jaws 16 of the collet 18 can now be moved or sprung inwardly to grip the stock rod 42 by any suitable means such as the operating tube 14 of FIG. 1, and a machining or working operation performed on the projecting portion of the stock. Should the stock rod 42 begin to slip rearwardly into the collet, during a hammering or broaching operation on the end of the stock for example, the slightest axial movement of the stock rod causes the rod to be firmly clamped between side or wall portions of the apertures 58 and 40, as also illustrated in FIG. 3, and thus locked against further axial movement in a rearward direction. Upon subsequent feeding of the stock rod forwardly, the locking member automatically moves to a non-clamping or rod releasing position. A locking device is thus provided in which one of two juxtaposed apertures is caused to move laterally to clamp stock material between side wall portions of the apertures.

While I have described and illustrated a preferred embodiment of the invention, it is to be understood that the invention is to be limited only by the scope of the appended claims.

I claim:

1. In a collet for supporting rod-like stock material during a machining operation, the combination of a hollow body member, a plurality of stock gripping jaws at one end of the body member, and means in said body member for locking the stock material against movement rearwardly from said jaws upon slippage of the material in the jaws, said last named locking means comprising first and second elements provided with juxtaposed respective first and second apertures adapted slidably to receive the stock material therethrough, and means for moving one of said elements and its aperture laterally so as to clamp the stock material between side wall portions of the first and second apertures.

2. In a collet having a plurality of jaws for gripping a rod or the like of stock material, a body member having a hollow cavity rearward of the opening between the jaws, a locking member positioned in said cavity and movable into and out of clamping engagement with stock material in the collet, and means contained in said cavity for moving said locking member into clamping engagement with stock material upon slight rearward movement of the stock material and permitting movement of the locking members to a non-clamping position upon forward feeding of the stock material, said last named means comprises cooperating cam surfaces carried by the body member and the locking member so as to move the locking member laterally upon movement thereof axially of the collet, and an offcenter work receiving aperture provided in the locking member.

3. A collet as set forth in claim 1, in which said last named means comprises cooperating frusto-conical surfaces on said first and second elements and an offcenter work receiving aperture provided in one of said elements.

4. A collet stock lock comprising a hollow body member having a bushing at one end and adapted to communicate with stock gripping jaws at its opposite end, said bushing being provided with a first aperture adapted slidably to receive stock material, said bushing being provided with a frusto-conical surface surrounding said first aperture and in axial alignment therewith, an axially movable locking member positioned within said body member and having a surface adapted to mate with the frusto-conical surface of the bushing, and a second aperture for slidably receiving stock material provided in said locking member with the axis of said second aperture offset from the axis of said surface on the locking member whereby said second aperture in the locking member is caused to move laterally upon axial movement of the locking member to clamp stock material between side portions of said first and second apertures.

5. A collet as set forth in claim 1 in which said last named means comprises cooperating frusto-conical surfaces on said first and second elements and an offcenter work receiving aperture provided in said second element, and resilient means within said body member normally urging said second element towards said first element so as to retain said mating surfaces in a nesting relationship.

6. A collet for gripping rod-like stock material during a machining operation comprising a hollow body member open at one end and provided with stock-gripping spring jaws at its other end, a removable bushing for normally closing said open end of the body member, said bushing being provided with an aperture in substantially axial alignment with the opening between said jaws for slidably receiving stock material therethrough and having a frusto-conical inner surface surrounding said stock receiving aperture and in axial alignment therewith, and an apertured locking member loosely mounted within said body member between said bushing and said jaws, said locking member having a surface adapted to mate with said frusto-conical surface of said bushing and the aperture in said locking member being of a size and shape slidably to receive stock material therethrough and having its axis slightly offset from the axis of said frusto-conical surface on said locking member whereby said aperture is caused to move laterally upon axial movement of the locking member towards said bushing so as firmly to clamp stock material between side portions of said apertures.

7. A collet as set forth in claim 6 in which a compression spring is positioned in said body member between said locking member and said jaws resiliently to retain said mating surfaces in nesting relationship and normally to urge the locking member towards the clamping position.

8. A collet as set forth in claim 6 in which said apertured locking member comprises a flanged disc having a frusto-conical surface on one face of the flange and the stock receiving aperture is positioned off center on the face of the disc.

9. In a machine tool for performing work operations on an extended end of rod-like stock material, the combination of a hollow spindle adapted to support work stock fed through the hollow interior of the spindle, a collet having spring jaws for frictionally gripping work stock mounted in one end of the spindle, means supported by said spindle and movable axially thereof for operating said jaws into gripping and non-gripping positions, and locking means contained in said collet for locking stock material against axial movement backwardly into the spindle upon slight slippage of the stock material within the spring jaws, said last named locking means comprising a first element disposed within said collet and having a first aperture in axial alignment therewith member through which the stock material is adapted to pass, and a second element disposed within said collet and having a second aperture therethrough through which said stock material is adapted to pass, means for moving said second element relative to said first element so as to cause said second aperture to shift laterally with respect to said first aperture and thereby clamp the stock material between side wall portions of said first and second apertures.

10. A combination as set forth in claim 9 in which said last named locking means is operable independently of the jaw operating means to release the stock material from a locked condition upon forward feeding movement of the material within the spindle.

11. In a collet for supporting rod-like stock material during a machining operation, the combination of a hollow body member, a plurality of stock gripping jaws at one end of said body member, and means in said body member for locking the stock material against rearward axial movement relative to said jaws during a machining operation, said last named locking means comprising a first element disposed within said body member and having a first aperture in axial alignment therewith through which the stock material is adapted to pass, and a second element disposed within said body member and having a second aperture therethrough, through which said stock material is adapted to pass, means for moving said second element relative to said first element so as to cause said second aperture to shift laterally with respect to said first aperture and thereby clamp the stock material between side wall portions of said first and second apertures.

12. The collet set forth in claim 11, wherein said first element comprises a bushing rigidly secured to said body member.

13. The collet set forth in claim 11, wherein said second element is movably carried on said first element with said first and second apertures being disposed in juxtaposed relation.

14. The collet set forth in claim 11, and further comprising resilient means disposed within said body member and engaging said second element for normally urging said second element into clamping engagement with the stock material upon the slightest rearward movement of the stock material, said resilient means permitting movement of said second element to a non-clamping position upon forward feeding of the stock material.

15. The collet set forth in claim 11, wherein said first element comprises a bushing and said second element comprises a locking member carried by said bushing, said bushing and said locking member being provided with cooperating cam surfaces effective to move the locking member laterally upon movement thereof axially of the collet, said second aperture in the locking member being disposed off center with respect to the longitudinal axis thereof.

16. The collet set forth in claim 15, wherein said cooperating cam surfaces of said bushing and said locking member are frusto-conical in configuration.

References Cited

UNITED STATES PATENTS

| 2,355,866 | 8/1944 | Ingalls | 279—28 |
| 2,585,510 | 2/1952 | Smith | 279—46 |

ROBERT C. RIORDON, Primary Examiner

R. V. PARKER, Jr., Assistant Examiner

U.S. Cl. X.R.

226—128, 147; 279—28